(12) United States Patent
Jokschas et al.

(10) Patent No.: US 6,994,768 B2
(45) Date of Patent: Feb. 7, 2006

(54) CYLINDRICAL FILTER ELEMENT

(75) Inventors: Guenter Jokschas, Murrhardt (DE); Helmut Luka, Marbach (DE); Norbert Strassenberger, Adlkofen (DE); Gerhard Vilsmaier, Unterdietfurt (DE); Matthaeus Huber, Reisbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 398 days.

(21) Appl. No.: 10/151,294

(22) Filed: May 21, 2002

(65) Prior Publication Data

US 2003/0010707 A1    Jan. 16, 2003

(30) Foreign Application Priority Data

May 21, 2001   (DE) ................................. 101 24 612

(51) Int. Cl.
*B32B 31/00*    (2006.01)
*B32B 31/04*    (2006.01)

(52) U.S. Cl. ........................ 156/293; 156/83; 156/294; 264/343

(58) Field of Classification Search ................. 156/69, 156/83, 293, 294; 264/342
See application file for complete search history.

(56) References Cited

U.S. PATENT DOCUMENTS

| 5,413,712 A | * | 5/1995 | Gewiss et al. ............... 210/450 |
| 5,547,480 A |   | 8/1996 | Coulonvaux |
| 5,736,040 A |   | 4/1998 | Duerrstein et al. |

FOREIGN PATENT DOCUMENTS

| DE | 2429474 | * | 11/1975 |
| DE | 19829989 |  | 1/2000 |
| DE | 19930614 |  | 1/2001 |
| EP | 1092461 | * | 4/2001 |
| JP | 1-171607 | * | 7/1989 |
| WO | WO 97/37743 | * | 10/1997 |
| WO | WO 00/01464 | * | 1/2000 |
| WO | 01/02079 |  | 1/2001 |

* cited by examiner

*Primary Examiner*—Steven D. Maki
*Assistant Examiner*—Justin Fischer
(74) *Attorney, Agent, or Firm*—Crowell & Moring LLP

(57) ABSTRACT

A cylindrical filter element which comprises a folded filter medium, in particular having a pleated configuration, which is annularly secured to a hollow cylinder, two expanded film axial end plates, and a support tube which is integrated into the cylindrical filter element and upon which the folded filter medium may be affixed. The support tube has an annular components adjacent respective axial end plates which has an interlocking fit with the film end plates and which may be connected to a sealing element.

3 Claims, 3 Drawing Sheets

CYLINDRICAL FILTER ELEMENT

BACKGROUND OF THE INVENTION

The present invention relates to a cylindrical filter element and to a method for producing such a cylindrical filter element.

Cylindrical filter elements having film end plates as a closure are known, for example, from Duerrstein et al., U.S. Pat. No. 5,736,040 (=DE 44 28 139). The end plates on the end faces of the filter element have an elastic design and are made of films which are heated for joining to the filter medium. The heating causes the films to expand toward the filter medium and partially penetrate same, thereby forming a seal on the end face of the filter folds. At the same time, the film material is cured by the heating, thus forming a firm connection by adhesion to the filter material.

A filter cartridge is known from Coulonvaux, U.S. Pat. No. 5,547,480 (=WO 95/19832) which is arranged in a housing having an inlet for untreated air and an outlet for clean air. Such a filter cleans the intake air in an internal combustion engine. The filter cartridge is braced between two concentric surfaces of the filter housing. The bracing action simultaneously creates a seal, which must be reliably maintained during shock or vibration.

German Patent Application No. DE 199 30 614 A1 (=U.S. Ser. No. 10/032,504) describes a filter cartridge, in particular for the air filter of an internal combustion engine. The filter cartridge is made of a filter paper which is folded in a zigzag shape and annularly joined to a cylindrical casing of the filter element. The end faces of the filter medium are cast inside a base plate and a cover plate. In the cylindrical interior of the filter element is situated a support tube having an elastic zone at its outlet end which is formed by axial slits in the end of the tube. The end of the support tube is made expandable in the radial direction by means of the elastic zone. Since the support tube is cast inside the cover plate, it expands along with the cover plate onto the connecting sleeve during installation of the filter element, thereby maintaining a positive-fit connection between the support tube and the cover plate.

Finally, a cylindrical filter element is described in German Patent Application No. DE 198 29 989 A1 which has resilient end plates which terminate the end faces of a filter medium. A support tube has elastic zones on its ends, formed by slits, which have a positive fit with the resilient end plates. This connection yields when sealing surfaces are mounted on corresponding connection pieces in the filter housing, so that an additional seal is not necessary. Integration of the support tube into the filter element facilitates installation in the housing.

The film end plates of the known filter elements are usually adhered so as to be even with the support tube. This often results in poor adhesion quality due to the production process in which the film is subjected, for example, to elevated temperatures (approximately 220° C.) for an extended period and fails to cure completely. This can lead to swelling of the end plates, and the adhesive bond can partially detach or pull away under certain conditions. This is especially disadvantageous if the filter is used as a fuel filter.

SUMMARY OF THE INVENTION

It is therefore the object of the present invention to provide an improved filter element which avoids the aforementioned disadvantages of the prior art.

A further object of the invention is to provide a filter element which assures an improved connection between the support tube and the end plates.

Another object of the invention is to provide a filter element with improved connections between parts which can be manufactured at reasonable cost.

These and other objects are achieved in accordance with the present invention by providing a filter element comprising a folded filter medium which is annularly joined to form a hollow cylinder, a pair of film end plates at axial ends thereof, and a support tube which is inserted into the cylindrical filter element and to which the folded filter medium is affixed, wherein the support tube comprises an annular component adjacent each of the axial end plates, each said annular component having an positively engaged fit with the respectively adjacent axial end plate and being connected to a sealing element.

Further advantageous preferred embodiments are described hereinafter.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figures 1A, 1B:
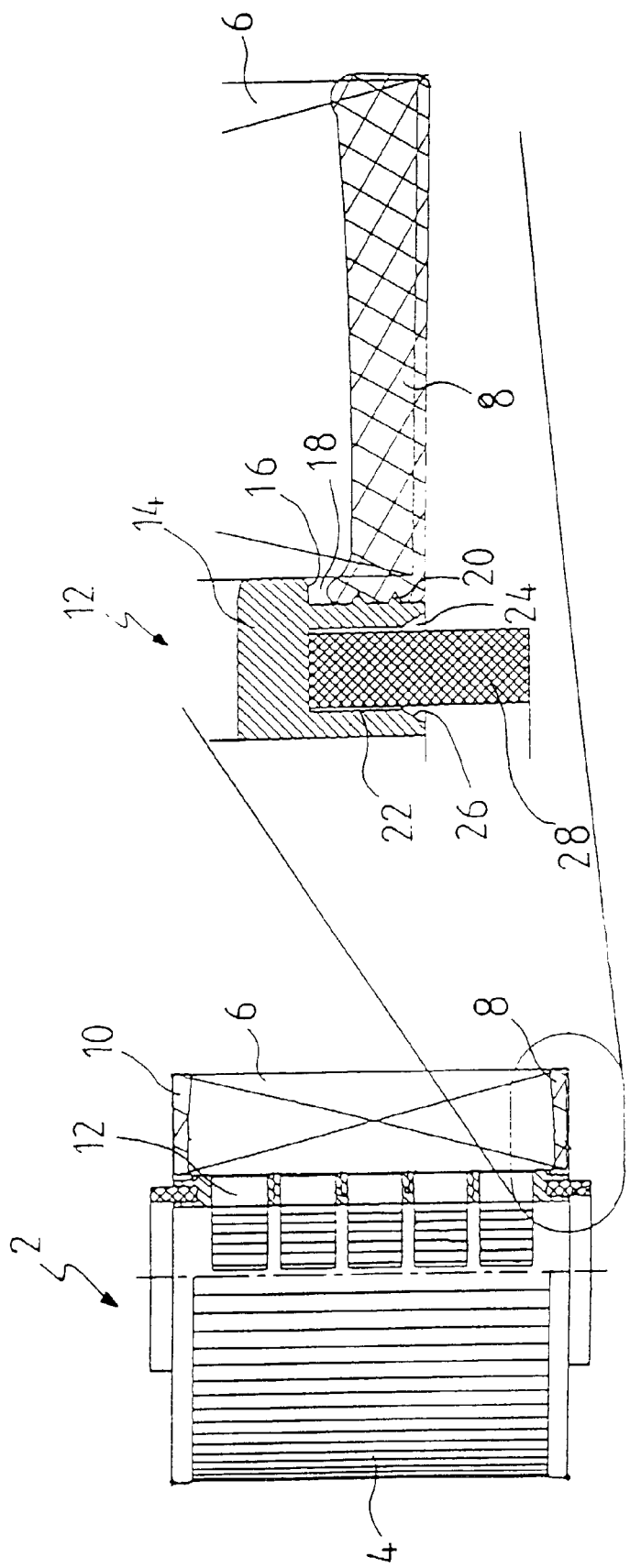
FIG. 1A shows a cross section through a cylindrical filter element according to the invention.
FIG. 1B shows an enlarged sectional detail view from FIG. 1A depicting a first embodiment of the inventive connection between the adhesive film and the support tube.

FIG. 1A shows a section through a cylindrical filter element 2, which is made of a filter medium 6 folded in a zigzag shape or pleated configuration. A base plate 8 and a cover plate 10 into which the filter medium is cast, are provided on the end faces of filter medium 6. The base and cover plates are constructed as film blanks with which the folded filter medium 6 is brought into contact. The resulting component assembly is then heated. The film material is thus caused to expand toward an end face of filter medium 6, with the result that the filter medium is enclosed by or embedded within the expanded film material. The end plates 8 and 10 are then formed by curing the film material.

Folded filter medium 6 is affixed to a support tube 12 which is integrated into cylindrical filter element 2. This support tube may comprise one or more parts. In a multi-part arrangement, the individual parts may be interengaged with one another by a snap lock or similar fastening mechanism.

FIG. 1B shows a section from FIG. 1A which represents the lower region of support tube 12 along with base plate 8. In this lower region, support tube 12 carries on its side facing filter medium 6 an annular component or member 14 which with its lower end terminates at the end face of base plate 8.

Component 14 can be made, for example, of a synthetic resin material, such as polyamide. On its side facing filter medium 6, component 14 has a shoulder 16 which in the region of base plate 8 forms an annular recess 18 in which the side of base plate 8 facing support tube 12 comes to rest.

Below shoulder 16 in the region of annular recess 18, component 14 has at least one circumferential annular ridge or radially outward protrusion 20 which contacts the film material of base plate 8. In the present example, two such circumferential ridges 20 are provided.

When the film material is heated, it expands toward the support tube 12, as well as toward the filter material, so that after curing a positive-fit or interengaged connection is formed between base plate 8 and component 14.

Component 14 also comprises an internal circumferential channel or groove 22 which, in the outer region of its opening 24 pointing toward the axial end face of base plate 8, has side edges 26 which taper in the direction of the support tube. The depth of channel 22 preferably corresponds to the height of annular recess 18. A circumferential sealing element 28 may be inserted into channel 22. In this way the filter element can be axially sealed in its housing. For this purpose the seal advantageously projects approximately 4 mm beyond side edges 26.

During manufacture of cylindrical filter elements, support tube 12, which as already indicated may comprise one or more parts, is completely assembled and adhered to filter medium 6. It is desirable for the adhesion surface to be as large as possible. Care must be taken not to damage the filter paper or filter medium 6 by the adhesion. In this way a reliable seal is achieved between the end plates, the filter medium, and the support tube. A reliable seal which may be used in particular for fuels is thus formed, since in this way the film end plates may be prevented from swelling under the effect of fuel penetration.

Although the invention has been described here only with respect to the connection between support tube 12 and base plate 8, it should be apparent that a corresponding connection also exists between the support tube and cover plate 10 which is situated opposite base plate 8.

With the described improved connection between the support tube and film end plate, sealing points, which have hitherto been necessary in the prior art, may be omitted. This is important, on the one hand, when the filter element is used as a fuel filter (the filter fineness and the demands on the filter are considerably greater for fuels than, for example, for oil), and on the other hand, this permits simpler production of the cylindrical filter elements as a result of considerably lower machine cycle times.

Figure 2:
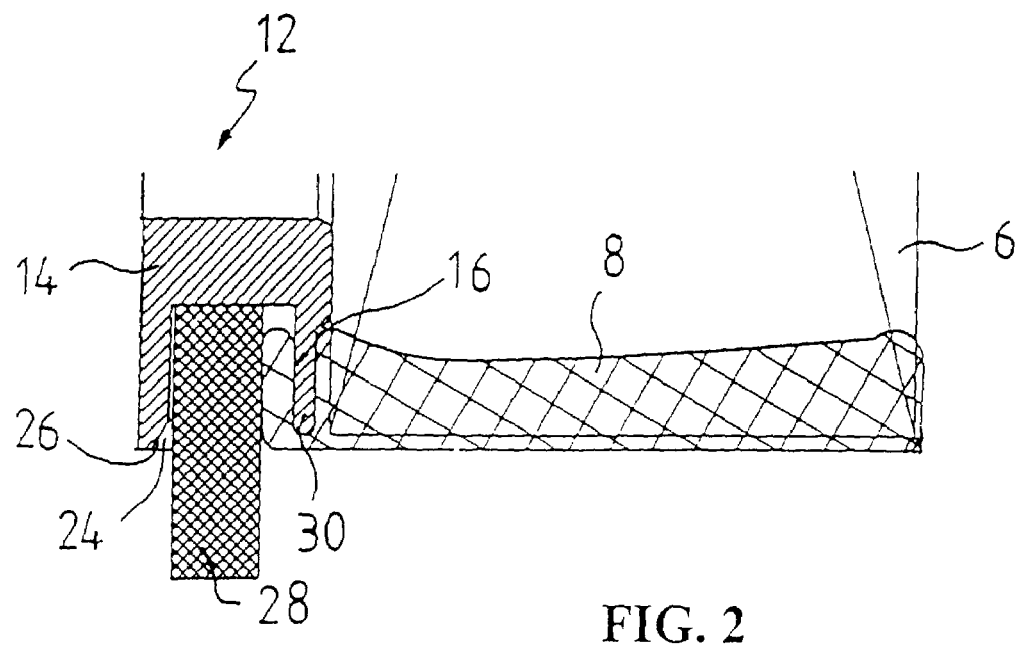
FIG. 2 shows a second embodiment of the inventive connection between the adhesive film and the support tube.

FIG. 2 shows a further advantageous embodiment of the connection according to the invention in which like parts are identified by the same reference numerals. In this case, component 14 at the lower end of support tube 12 is constructed in such a way that it does not terminate at the end face of base plate 8 with its side which faces toward filter medium 6, but instead has a projecting finger or peg-like extension 30 formed on shoulder 16 which is formed on the side of component 14 which faces toward filter medium 6. Extension 30 ends just underneath the surface of the axial end face of base plate 8.

Shoulder 16 thus has a narrower design than in the embodiment according to FIG. 1B, with the result that opening 24 is enlarged. In the present embodiment, only the side of component 14 facing toward support tube 12, in the axially outer region of component 14 facing toward the end face of base plate 8, has a side edge 26 which tapers in the direction of the support tube.

In this way, the film material of base plate 8 can surround the peg-like extension 30 when the film material is applied to the filter medium 6 in that it fills the space below shoulder 16 and also partially fills opening 24 of component 14. The side of base plate 8 facing toward support tube 12 thus forms a direct connection with the sealing element 28 which is inserted into opening 24, resulting in a reliable sealing of filter medium 6 after the film material is cured.

In addition, the effective adhesion surface is increased, and a positively engaged connection is created between the end plate and filter medium 6. As already described in conjunction with the embodiment in FIG. 1B, a corresponding connection also exists between the support tube and cover plate 10 which is situated opposite base plate 8.

Figure 3:
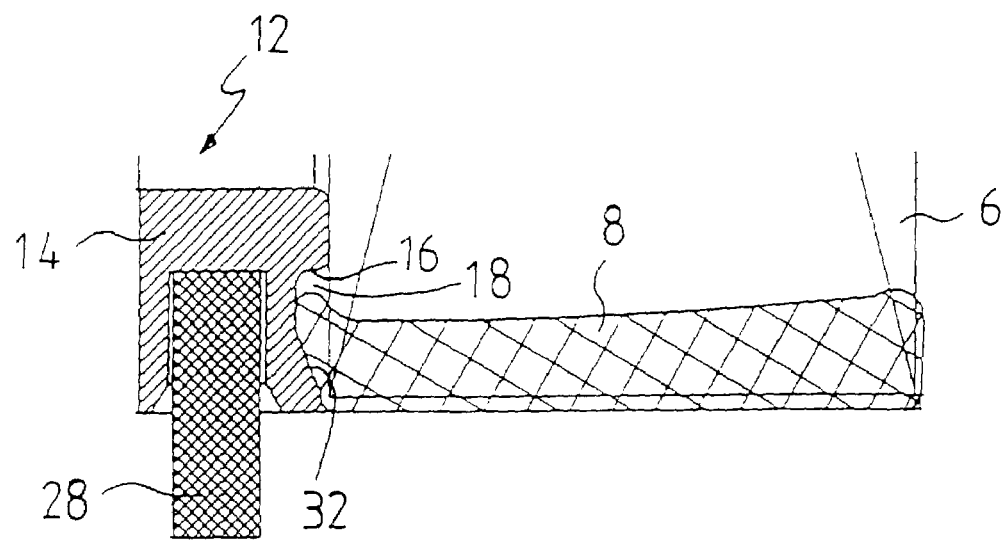
FIG. 3 shows a third embodiment of the inventive connection between the adhesive film and the support tube.

A further advantageous embodiment of the invention is shown in FIG. 3. As in FIG. 1B, the lower region of support tube 12 here also carries on its side facing filter medium 6, an annular component 14 which terminates with its lower end at the axial end face of base plate 8. Component 14, on its side facing toward filter medium 6, also has a shoulder 16, thus creating an annular recess 18 in the region of base plate 8. In this embodiment, however, the edge 32 of annular recess groove 18 pointing toward the axial end face of base plate 8 is beveled in the direction of filter medium 6, so that annular groove 18 tapers in the direction of the end face of base plate 8.

Figure 4:
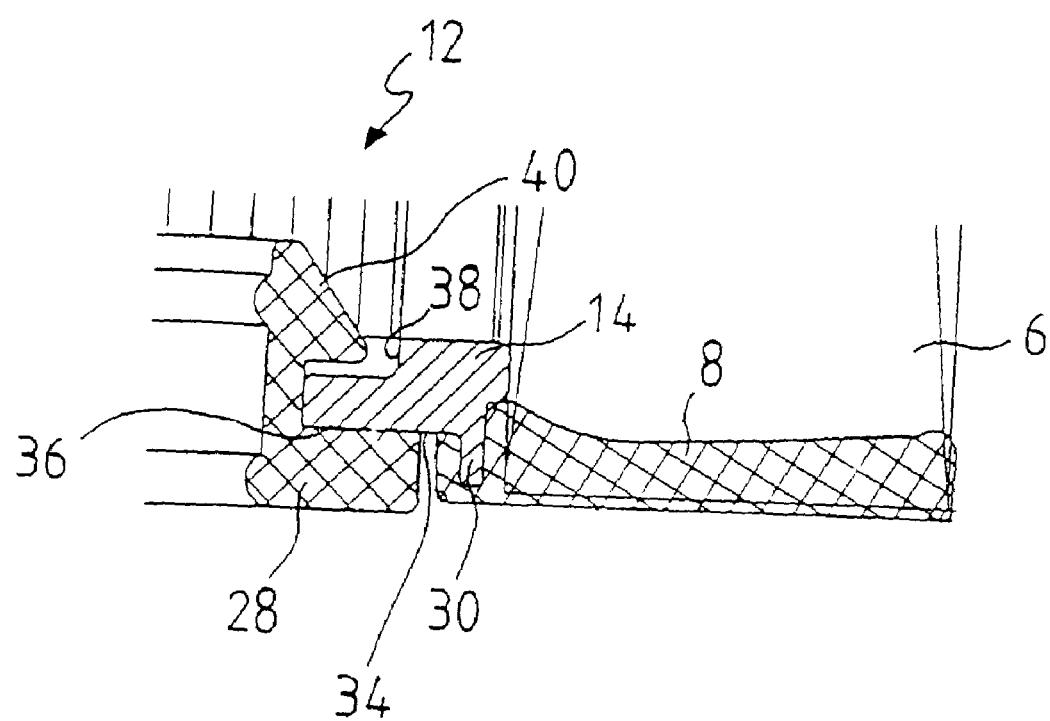
FIG. 4 shows a fourth embodiment of the inventive connection between the adhesive film and the support tube.

FIG. 4 shows another advantageous embodiment of the invention. As in the embodiment according to FIG. 2, annular component 14 has a peg-like extension 30 which is enclosed by the film material of base plate 8. However, the component has no groove or opening in which a sealing element 28 may be inserted. Instead, component 14 has a straight construction on its side facing toward support tube 12, and has a contact surface 34 through which it is connected to a corresponding surface 36 of sealing element 28.

On its side facing away from base plate 8, component 14 has a shoulder 38 in which a correspondingly shaped projecting piece 40 of sealing element 28 can engage, whereby sealing element 28 requires a sufficiently large installation space for proper seating.

For production reasons, e.g. to facilitate removal of molded synthetic resin parts from their molds, a plurality of parts may be interconnected to form an easily handled aggregate part, which can be later divided into individual parts.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for producing a cylindrical filter element comprising the steps of forming a cylindrical annulus of filter medium around a central support tube and joining the filter medium to the support tube;

applying a thermally expandable film to axial ends of the filter medium and heating the film to expand the film into the filter medium and against the support tube to form axial end plates in which the filter material is embedded;

wherein the end plates have a positive-fit connection to respective annular components carried on axial ends of the support tube and contact axial seal elements carried by the respective annular components, wherein said annular component comprises at least one radially extending annular protrusion extending around the support tube.

2. A method for producing a cylindrical filter element according to claim 1, wherein each annular component has an annular groove on an axial end face thereof into which an axial seal is inserted.

3. A method according to claim 2, wherein the filter medium has a pleated configuration.

* * * * *